June 23, 1953  B. M. TAYLOR  2,642,587
EXTENSIBLE BED AND SHELTER FOR MOTOR VEHICLES
Filed March 29, 1948  4 Sheets-Sheet 2
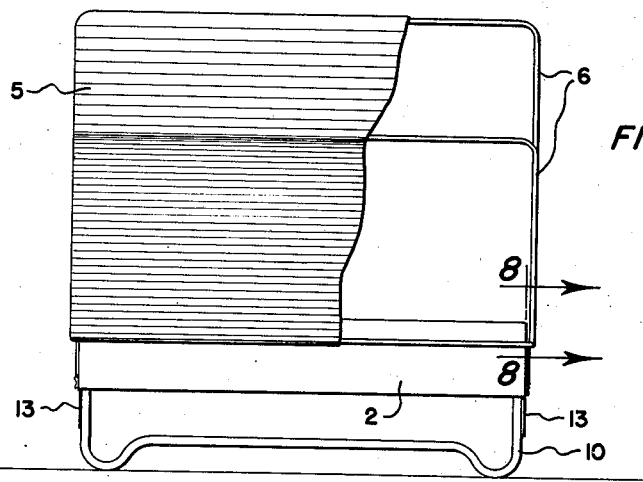
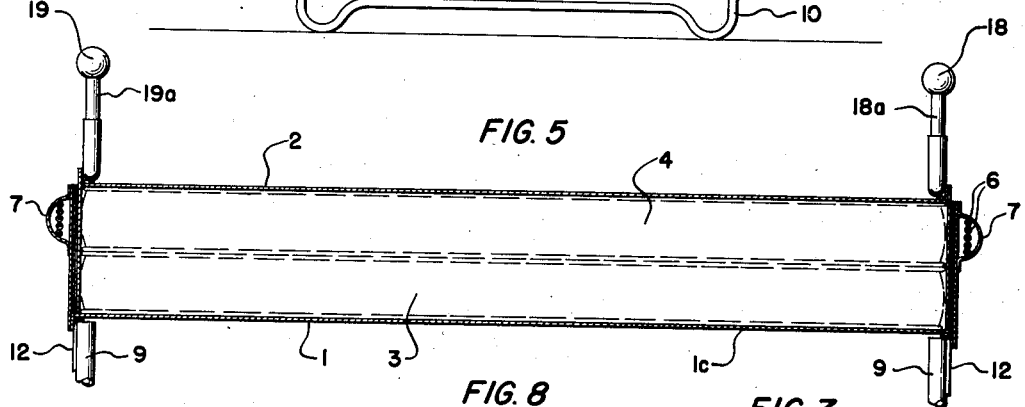
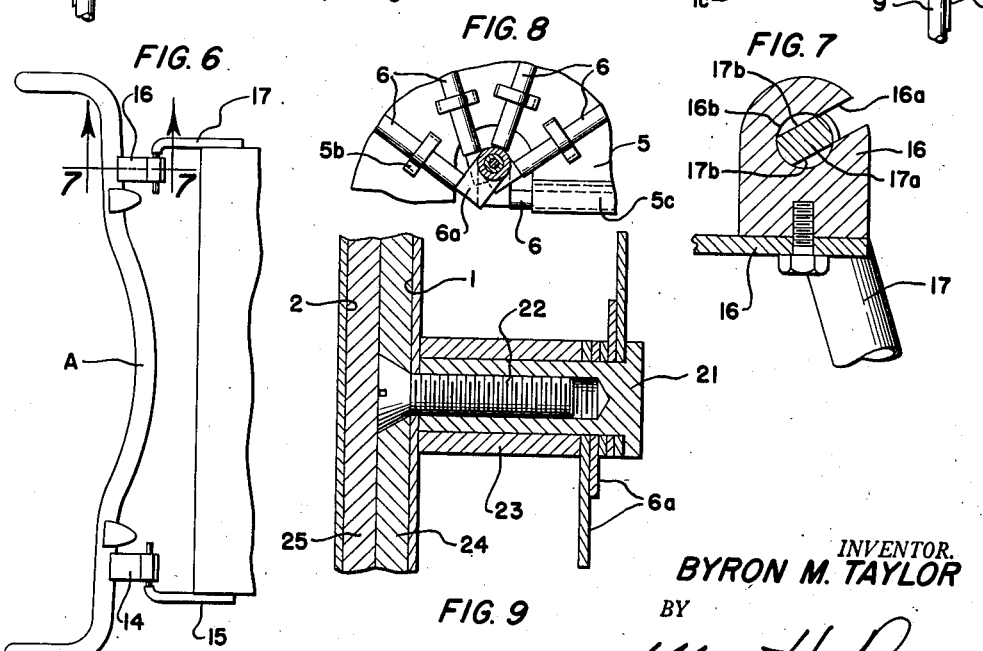
INVENTOR.
BYRON M. TAYLOR
BY
Wm. H. Dean
AGENT June 23, 1953          B. M. TAYLOR          2,642,587
EXTENSIBLE BED AND SHELTER FOR MOTOR VEHICLES
Filed March 29, 1948          4 Sheets-Sheet 3
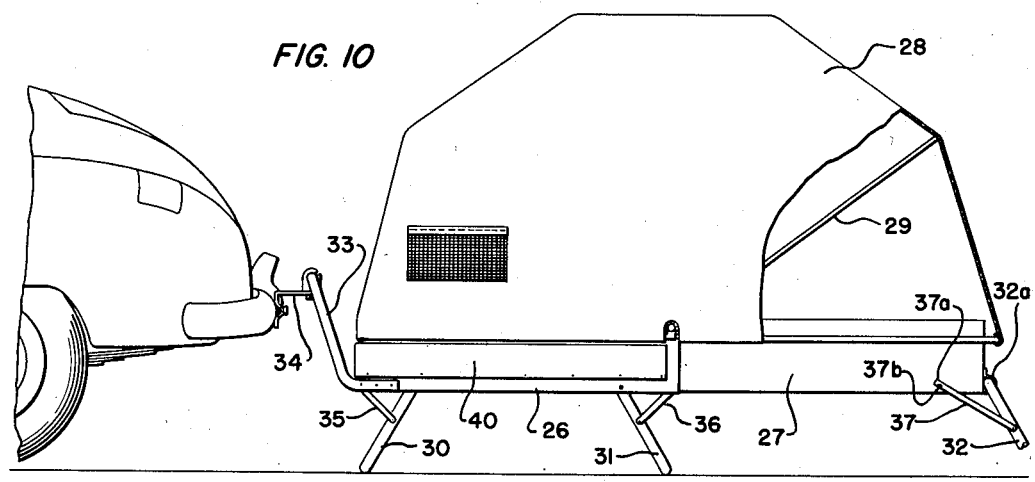
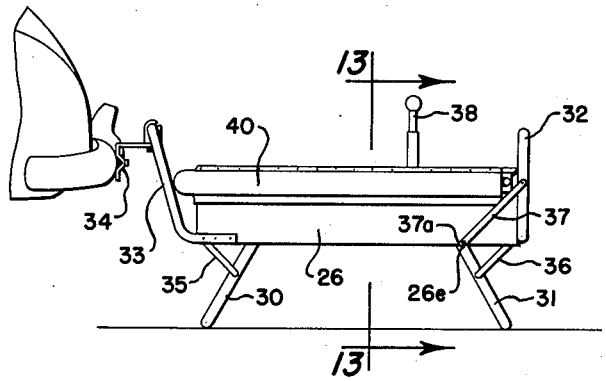
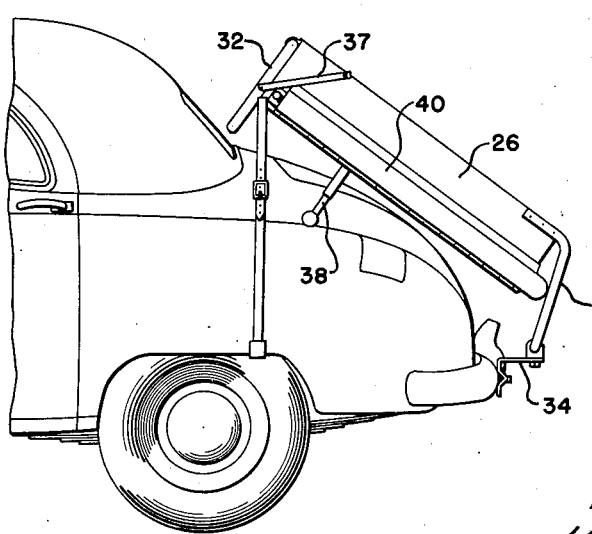
INVENTOR.
BYRON M. TAYLOR
BY
AGENT June 23, 1953   B. M. TAYLOR   2,642,587
EXTENSIBLE BED AND SHELTER FOR MOTOR VEHICLES
Filed March 29, 1948   4 Sheets-Sheet 4
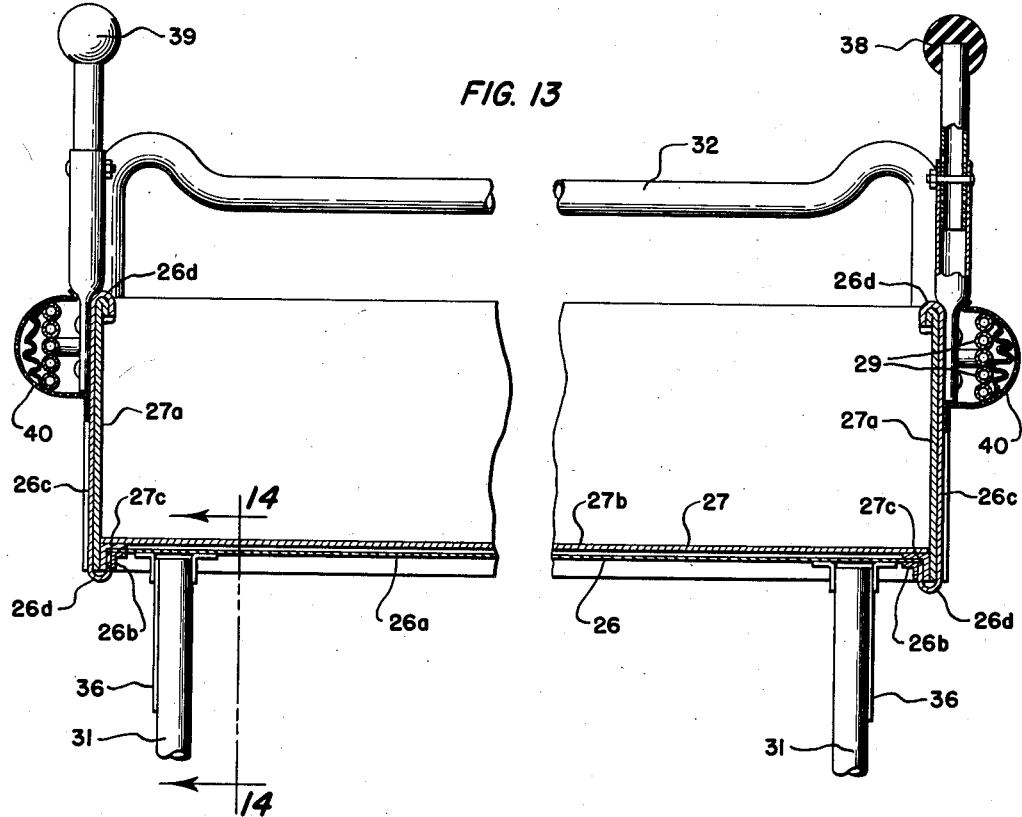
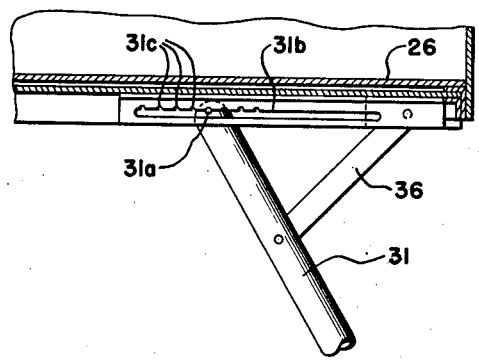
INVENTOR
BYRON M. TAYLOR
BY
*Wm. H. Dean*
AGENT Patented June 23, 1953

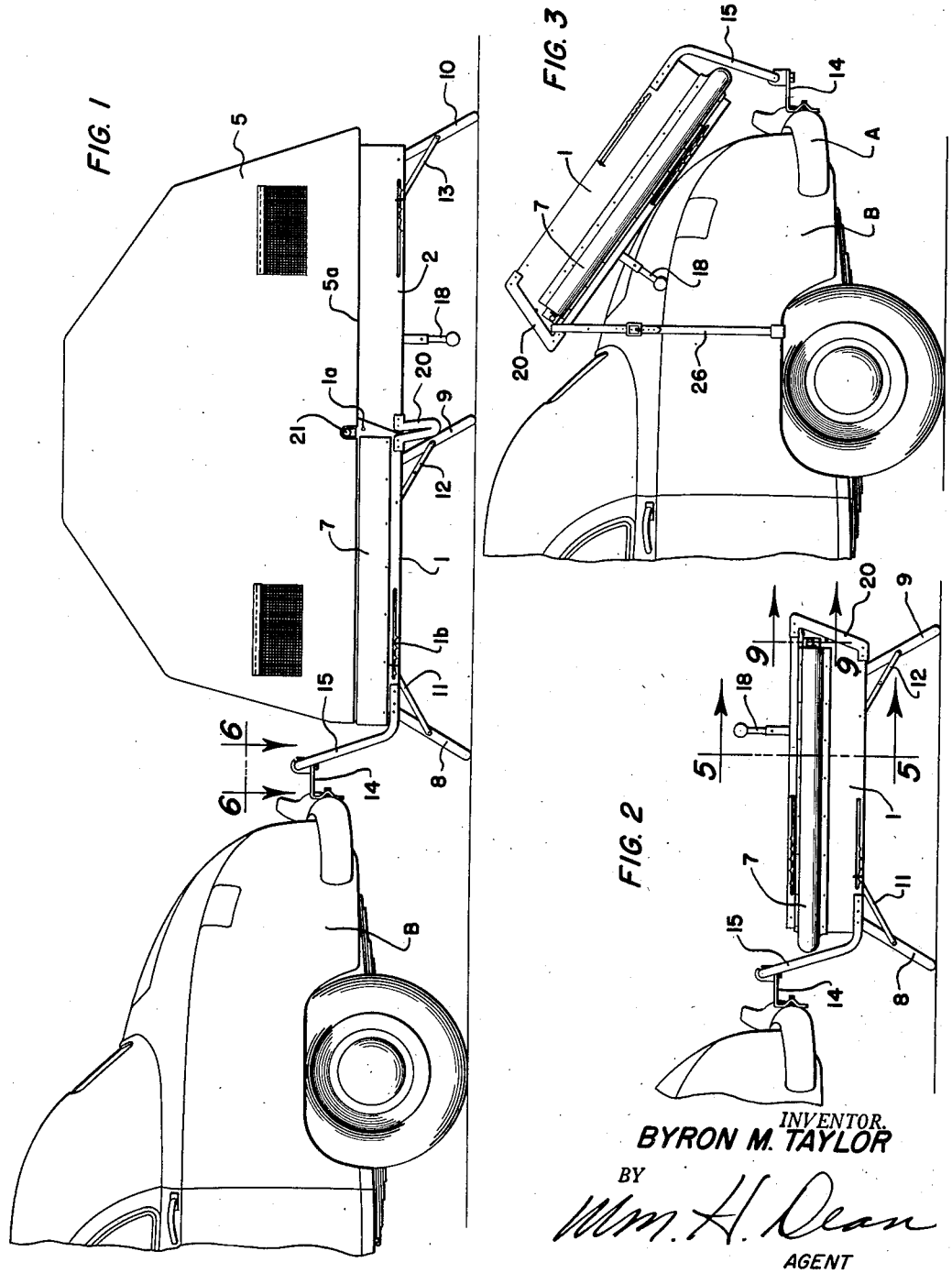

2,642,587

UNITED STATES PATENT OFFICE 2,642,587

EXTENSIBLE BED AND SHELTER FOR MOTOR VEHICLES

Byron M. Taylor, San Diego, Calif.

Application March 29, 1948, Serial No. 17,786

19 Claims. (Cl. 5—119)

My invention relates to an extendable bed and shelter for motor vehicles, and the objects of my invention are:

First, to provide an extendable bed and shelter of this class which may be very readily and quickly extended, without undue effort on the part of the operator thereof, from a position adjacent the rear of a motor vehicle on which it is wholly supported to a position on the ground rearwardly of said vehicle, providing sleeping accommodations for passengers of the vehicle, as desired;

Second, to provide an extenable bed and shelter for motor vehicles of this class, in which the bed is readily foldable and covered by a foldable canopy, all connected in unitary relationship to each other so that a minimum number of operations is required in setting up the extendable bed and shelter from its position on the rear of a vehicle to its position on the ground;

Third, to provide an extendable bed and shelter of this class which readily accommodates two persons;

Fourth, to provide an extendable bed and shelter of this class which is adapted for use in varying weather conditions, whereby the bed and shelter is maintained in dry condition when travelling in the rain and when set up as a sleeping accommodation for the occupants of the vehicle;

Fifth, to provide an extendable bed and shelter of this class in which the center of gravity thereof is disposed forwardly of the rear end of the vehicle in normal installations and totally supported on the vehicle which permits normal operation of said vehicle and does not adversely affect the balance or operating characteristics of the vehicle;

Sixth, to provide an extendable bed and shelter of this class which is very compact and light in proportion to its facilities;

Seventh, to provide an extendable bed and shelter of this class having novel connection bracket means permitting the vehicle to move away from the extendable bed and shelter and be readily disconnected therefrom when the bed and shelter is set up for use on the ground, and Eighth, to provide an extendable bed and shelter of this class which is very simple and economical of construction, efficient in operation, and which will not readily deteriorate or get out of order.

With these and other objects in view as will appear hereinafter, my invention consists of certain novel features of construction, combination, and arrangement of parts and portions and a certain modification, as will be hereinafter described in detail and particularly set forth in the appended claims, reference being had to the accompanying drawings and to the characters of reference thereon forming a part of this application in which:

Fig. 1 is a side elevational view of my extendable bed and shelter for motor vehicles shown in connected relationship with a motor vehicle at the rear thereof, Fig. 2 is a similar view to Fig. 1 showing my extendable bed and shelter in folded condition, Fig. 3 is a similar view showing progressive retraction of the folded condition of my extendable bed into supported relationship on the rear of the vehicle ready for transit, Fig. 4 is a rear elevational view of my extendable bed and shelter in the position as shown in Fig. 1 of the drawings, Fig. 5 is an enlarged transverse sectional view taken from the line 5—5 of Fig. 2, Fig. 6 is a fragmentary plan view taken from the line 6—6 of Fig. 1, Fig. 7 is an enlarged fragmentary sectional view taken from the line 7—7 of Fig. 6, Fig. 8 is an enlarged fragmentary sectional view taken from the line 8—8 of Fig. 4, Fig. 9 is an enlarged fragmentary sectional view taken from the line 9—9 of Fig. 2, Fig. 10 is a side elevational view of a modified form of my extendable bed and shelter, Fig. 11 is another view thereof similar to Fig. 2 of the principal structure, Fig. 12 is another side elevational view of the modified construction shown supported on a motor vehicle, Fig. 13 is a transverse sectional view taken from the line 13—13 of Fig. 11 showing the structure on enlarged scale and Fig. 14 is a fragmentary sectional view taken from the line 14—14 of Fig. 13.

Similar characters of reference refer to similar parts and portions throughout the several views of the drawings.

The frame boxes 1 and 2 are open at their normally upper sides when my extendable bed and shelter is in the position as shown in Fig. 1 of the drawings and adjacent ends of these boxes 1 and 2 are open for supporting the mattresses 3 and 4 in adjacent relationship to each other. It will be noted, however, that a continuous mattress extending throughout the frame boxes 1 and 2 may be employed, if desired, and such a continuous mattress will be folded against itself when the frame boxes 1 and 2 are in the position as shown in Fig. 2 of the drawings in which my extendable bed and shelter is shown in collapsed position. These frame boxes 1 and 2 are pivotally connected together at substantially the middle portion of the bed by means of pins 1a which extend through the bearing plates 24 and 25 and the sidewalls of the frame boxes 1 and 2, as shown in Figs. 1 and 9 of the drawings. Pivotally connected to the normally lower side of the frame box 1 are the substantially U-shaped legs 8 and 9. The braces 11 and 12 are pivotally connected to the legs 8 and 9 at opposite sides of the frame box 1 and brace 11 is adjustably supported at its other end in notched slot 1b in both sides of the frame box 1 below the bottom portion thereof, as shown in Fig. 1 of the drawings. The leg 10, pivoted to the frame box 2, is provided with a brace 13 similar to the brace 11 in connection with the leg 8, all as shown in Fig. 1 of the drawings. The feet 18 and 19 are soft, resilient members supported on arms 18a and 19a, which extend downwardly from the normally lower side of the frame box 2 and engage opposite sides of the automobile body B, as shown in Fig. 3 of the drawings, when my extendable bed and shelter is in the collapsed position, as shown in Fig. 3 of the drawings, supported on the automobile B. The brackets, 15 and 17 respectively, are rigidly connected to the frame box 1 and extend forwardly and upwardly therefrom in the position as shown in Fig. 1 of the drawings, and these brackets are similar in construction. The bracket 17 as shown in Fig. 7 of the drawings, is provided with an inwardly extending trunnion portion 17a having flats 17b thereon removable through the slot 16a in the bracket 16 when the bracket 17 is in the respective position, as shown in Fig. 7 of the drawings. These flats are substantially transverse to the slot 16a when the extendable bed and shelter is in the position as shown in Fig. 3 of the drawings, effectively preventing removal of the trunnion portions 17a from the bearing portion 16b in the bracket 16. The brackets 14 and 15 likewise cooperate in similar manner. It will be here noted that the frame boxes 1 and 2 in their pivotal connected relationship on the pins 1a provide for the collapsing of my extendable bed and shelter by pivoting the frame box 2 about the axis of the pins 1a which are substantially at a median point between the upper and lower edges of the frame boxes 1 and 2, so that the frame box 2 neatly nests within the frame box 1 holding the mattresses 3 and 4 against each other substantially on a plane at the median point aligned with the axis of the pins 1a shown in Fig. 1 just below the lower edge 5a of the canopy 5 which overlaps the upper edges of the frame boxes 1 and 2, as best indicated in Fig. 4 of the drawings. The canopy 5 is made of any suitable material, such as flexible treated canvas or the like and is supported on the tubular bows 6, each of which is provided with a bearing plate 6a on each opposite end thereof supported on one of the bow bearings 21. As shown in Fig. 4 drawings, the bows 6 are U-shaped and the canopy 5, as shown in Fig. 8 of the drawings, is connected to these bows 6 by transverse strips 5b sewed to the canopy 5 and surrounding the bows 6. Each bow bearing 21 is secured to one of the bearing plates 24 by a countersunk screw 22, as shown in Fig. 9 of the drawings, which is screw-threaded internally of the bow bearing 21 and the sleeve 23 operates as a spacer intermediate the outer side of the frame box 1 and the plates 6a secured to the ends of the bows 6 at opposite sides of said frame box 1. These plates 6a are freely pivotal on the bow bearings 21 which support the entire canopy 5 together with the bows 6. It will be noted that the rearmost canopy bow 6 is surrounded by a sewed loop 5c of the canopy 5 so that pivotal movement of the bows 6 on the bearing members 21 directly places the canopy 5 in tension and tight relationship, as shown in Fig. 1 of the drawings. It will be noted that the opposite end of the canopy connected to the frame box 1 is secured thereto and that all of the bows 6 when pivoted into the position as shown in Figs. 2 and 5 of the drawings are covered by the canopy cover 7, which consists of canvas strips on the outer side of the frame box 1 secured thereto by conventional snaps. This cover 7, as shown in Fig. 1 of the drawings, is folded downwardly from the normally lower edge thereof fixed to the frame box 1 as shown in Fig. 2 of the drawings. This canopy cover 7 surrounds three sides of the frame box 1 and is adapted to be folded upwardly from the position as shown in Fig. 1 of the drawings to the position as shown in Fig. 2 of the drawings when my extendable bed and shelter is collapsed into the position as shown in Fig. 2 of the drawings. The weather strip 20 interconnects adjacent ends of the frame boxes 1 and 2 at their bottom portions, as shown in Fig. 1 of the drawings, and covers these adjacent pivotally-connected ends of the frame boxes 1 and 2, as well as the mattresses 3 and 4 when in the folded position as shown in Fig. 2 of the drawings. The straps 26, as shown in Fig. 3 of the drawings, are used for the purpose of holding down my extendable bed and shelter in connection with the vehicle B during transit while the brackets 14 and 16 rigidly connected to the bumper A of the vehicle B carry a substantial part of the overall weight of my extendable bed and shelter.

The operation of my extendable bed and shelter for motor vehicles is substantially as follows:

During transit of the vehicle B, the extendable bed and shelter, as shown in Fig. 3 of the drawings, is carried an the rear portion of the vehicle wherein the center of gravity of the bed and shelter is forwardly disposed of the rear end of the vehicle and at a relatively low position thereon, so that undue change in balance of the vehicle is substantially eliminated. The overall weight of the extendable bed and vehicle is slight which is an advantage in such transportation thereof, as hereinbefore described. When the vehicle B reaches its destination and it is desired to employ the extendable bed and shelter as sleeping accommodations the straps 26 are released, whereupon the bed and shelter is pivoted downwardly to a position as shown in Fig. 2 wherein the brackets 15 and 17 pivot on their trunnion portions relatively to the brackets 14 and 16, respectively. The legs 8 and 9, however, are extended preliminary to the downward pivotal movement of the bed and shelter into the position as shown in Fig. 2 of the drawings, at which time the leg 10 may be extended so that pivotal movement of the frame 2 about the axis of the pin 1a may be accomplished, disposing said frame box 2 in the position as shown in Fig. 1 of the drawings. The canopy 5 may then be extended to the position as shown in Fig. 1 of the drawings by pivoting the bows 6 on the axes of the bolts 21. In the event that it is desired to leave the extendable bed and shelter in the position as shown in Fig. 1 of the drawings and remove the vehicle therefrom, the flats 17b aligned with the slot 16a of the bracket 16 and corresponding flats on the bracket 15 aligned with the corresponding slot in the bracket 14 to permit these brackets 14 and 16 to be moved away from the extendable bed and shelter in their rigid connected relationship with the vehicle B, as desired. The mattresses 3 and 4 when in the position as shown in Fig. 1 are disposed in the box frames 1 and 2 respectively, and in the event the mattress is a continuous mattress the upper folded portion thereof is extended into the frame box 2 when pivoted into the position as shown in Fig. 1 of the drawings from the position as shown in Fig. 2 of the drawings. When the extendable bed and shelter is in transit, as shown in Fig. 3 of the drawings, the weatherstrip 20 protects the mattresses 3 and 4 together with the interior of the extendable bed and shelter from the weather while the canopy cover 7 protects the canopy 5 in a similar manner. In order to adjust the frame boxes 1 and 2 into level position in accordance with the surface of the ground, the legs 8 and 10 may be adjusted by the adjustable braces 11 and 13, respectively, in the frame boxes 1 and 2, as hereinbefore described.

In the modification as shown in Figs. 10 to 14, inclusive, of the drawings, the parts are designated as follows:

The frame boxes 26 and 27, canopy 28, bows 29, legs 30, 31, and 32, brackets 33 and 34, braces 35, 36, 37, feet 38 and 39, and the canopy cover 40. The modified construction of my extendable bed and shelter for motor vehicles is similar to the principal structure hereinbefore described in connection with Figs. 1 to 9, inclusive, of the drawings, except that the frame boxes 26 and 27 are telescopically connected with each other rather than being pivotally connected to each other as the frame box 2 is pivotally connected to the frame box 1. The frame box 26 is provided with a bottom plate 26a having angle members 26b at opposite edges thereof with which the side plates 26c are connected. These side plates 26c are provided with channel-shaped portions 26d at their upper and lower edges in which the upper and lower edges of the side plates 27a of the frame box 27 are telescopically mounted. This frame box 27 is provided with a bottom plate 27b having angular members 27c connected at opposite edges thereof which support the side plates 27a. Thus, the side plates 27a together with the angle members 27c are longitudinally slideable in the channel-shaped portions 26d of the side plates 26c of the frame box 26, all as shown best in Fig. 13 of the drawings. Thus, the principal difference between the principal structure, as shown in Figs 1 to 9, inclusive, of the drawings, and the modified structure shown in Figs. 10 to 14, inclusive, of the drawings, is the telescopic relationship of the frame boxes 26 and 27. It will be noted that the leg 32 is pivoted in a loop bearing 32a at the end of the frame box 27 and that the brace 37 at its end 37a engages a pin 37b fixed to the frame box 27 at the outer side thereof spaced from the rear end thereof when in the position as shown in Fig. 10 of the drawings. When the frame boxes 26 and 27 are in the telescoped retracted relationship, as shown in Fig. 11 of the drawings, a slot in the end 37a of the brace 37 engages a pin 26e on the outer side of the frame box 26 for locking the frame box 27 longitudinally of the frame box 26 preventing the same from sliding therein, and in this position the leg 32 is pivoted upwardly in transverse relationship to the longitudinal plane of the frame box 27. The legs 30 and 31 are similar in construction and the leg 31 as shown in Fig. 14 of the drawings is provided with a pin 31a at its upper end engageable with a slotted rack 31b secured to the lower side of the frame box 26, and this slot of the rack 31b is provided with spaced notched portions 31c engageable by said pin 31a for adjusting the angular disposition of the leg 31 positively linked to the frame box 26 by means of the brace 36, all as shown best in Fig. 14 of the drawings.

The operation of the modified structure, as shown in Figs. 10 to 14, inclusive, of the drawings, is substantially as follows:

The bows 29 operate in a similar manner to the bows 6 hereinbefore described, and the frame boxes 26 and 27 are telescopically moveable relative to each other, the box 27 slideable within the box 26, thus the mattress normally carried in the boxes 26 and 27 must be folded preliminary to the telescopic collapse of the extendable bed wherein the box 27 is slideably telescoped longitudinally of the box 26 thereinto. The operation of the brackets 33 and 34 is similar to the brackets 14 and 15 hereinbefore described, so that the distinguishing feature between the principal construction described herein and the modified construction is that the frame boxes of the principal construction are pivoted together while the frame boxes of the modified structure are telescopically connected together.

Though I have shown and described a particular construction, combination and arrangement of parts and portions and a certain modification, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In an extendable bed and shelter of the class described, the combination of a pair of box-shaped frame members extendably connected together, having normally enclosed bottom portions and open upper sides, canopy bows having pivoted attachment means at adjacent ends of said frame boxes when in extended relationship to each other, each of said pivoted means including a bracket secured to said frame boxes, said bracket having a stud and end plates secured thereto whereby coaxial ends of the bows may be fastened on said stud by said end plates, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed.

2. In an extendable bed and shelter of the class described, the combination of a pair of box-shaped frame members extendably connected together, having normally enclosed bottom portions and open upper sides, canopy bows having pivoted attachment means at adjacent ends of said frame boxes when in extended relationship to each other, each of said pivoted means including a bracket secured to said frame boxes, said bracket having a stud and end plates secured thereto whereby coaxial ends of the bows may be fastened on said stud by said end plates, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed, and a flexible canopy covering said bows.

3. In an extendable bed and shelter of the class described, the combination of a pair of box-shaped frame members extendably connected together, having normally enclosed bottom portions and open upper sides, canopy bows having pivoted attachment means at adjacent ends of said frame boxes when in extended relationship to each other, each of said pivoted means including a bracket secured to said frame boxes, said bracket having a stud and end plates secured thereto whereby coaxial ends of the bows may be fastened on said stud by said end plates, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed, a flexible canopy covering said bows, legs pivotally connected with the normally bottom sides of said frame boxes for supporting the same on the ground and adjustable bracing members for varying the height of said legs.

4. In an extendable bed and shelter of the class described, the combination of a pair of box-shaped frame members extendably connected together, having normally enclosed bottom portions and open upper sides, canopy bows pivoted at adjacent ends of said frame boxes when in extended relationship to each other, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed, a flexible canopy covering said bows, legs pivotally connected with the normally bottom sides of said frame boxes for supporting the same on the ground, bracket means in connection with one of said boxes being adapted to support said extendable bed on the rear end of a motor vehicle and positive locking means for securing said bed to said bracket when said bed is secured to a motor vehicle and in folded and collapsed position.

5. In an extendable bed and shelter of the class described, the combination of a pair of box-shaped frame members extendably connected together, having normally enclosed bottom portions and open upper sides, canopy bows pivoted at adjacent ends of said frame boxes when in extended relationship to each other, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed, a flexible canopy covering said bows, legs pivotally connected with the normally bottom sides of said frame boxes for supporting the same on the ground, and bracket means in connection with one of said boxes being adapted to support said extendable bed on the rear end of a motor vehicle, said frame boxes pivotally connected together at their adjacent ends substantially halfway between their upper and lower sides.

6. In an extendable bed and shelter of the class described, the combination of a pair of box-shaped frame members extendably connected together, having normally enclosed bottom portions and open upper sides, canopy bows pivoted at adjacent ends of said frame boxes when in extended relationship to each other, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed, a flexible canopy covering said bows, legs pivotally connected with the normally bottom sides of said frame boxes for supporting the same on the ground, and bracket means in connection with one of said boxes being adapted to support said extendable bed on the rear end of a motor vehicle, said frame boxes slideably telescopically connected together to the extent of approximately one half the extended length of the bed.

7. In an extendable bed and shelter for motor vehicles of the class described, the combination of a pair of extendably connected box frames each having an open upper side and one open end, said open ends being adjacent each other when said bed is in extended position, each of said box frames having pivoted and adjustably supported feet, and U-shaped bows connected at opposite sides of said box frames near their adjacent ends adapted to support a canopy thereover and extending over opposite ends of said frame boxes from their adjacent ends, said bows extending outwardly of said box-shaped frame members, whereby they may be positioned outwardly of one of said box-shaped frame members when the extendable bed is collapsed.

8. In an extendable bed and shelter for motor vehicles of the class described, the combination of a pair of extendably connected box frames each having an open upper side and one open end, said open ends being adjacent each other when said bed is in extended position, each of said box frames having pivoted and adjustably supported feet, U-shaped bows pivoted at outer opposite sides of said box frames near their adjacent ends adapted to support a canopy thereover and extending over opposite ends of said frame boxes and a flexible canopy over said bows covering both of said box frames, said bows extending outwardly of said box-shaped frame members, whereby they may be positioned outwardly of one of said box-shaped frame members when the extendable bed is collapsed.

9. In an extendable bed and shelter for motor vehicles of the class described, the combination of a pair of extendably connected box frames each having an open upper side and one open end, said open ends being adjacent each other when said bed is in extended position, U-shaped bows pivoted at outer opposite sides of said box frames near their adjacent ends adapted to support a canopy thereover and extending over opposite ends of said frame boxes, a flexible canopy over said bows covering both of said box frames, one of said box frames being retractable within the other to the extent of approximately one-half of the total length, and said bows extending outwardly of said box-shaped frame members whereby they may be positioned outwardly of one of said box-shaped frame members when the extendable bed is collapsed.

10. In an extendable bed and shelter for motor vehicles of the class described, the combination of a pair of extendably connected box frames each having an open upper side and one open end, said open ends being adjacent each other when said bed is in extended position, U-shaped bows pivoted at outer opposite sides of said box frames near their adjacent ends adapted to support a canopy thereover and extending over opposite ends of said frame boxes from their adjacent ends, a flexible canopy over said bows covering both of said box frames, one of said frames retractable within the other, said bows extending outwardly of said box shaped frame members whereby they may be positioned outwardly of one of said box shaped frame members when the extendable bed is collapsed, legs pivotally connected to the bottom of said frame boxes for supporting the same on the ground, bracket means in connection with one of said frame boxes connected to the rear of a motor vehicle, and said bracket means including a boss fixed to said motor vehicle having a slotted portion therein directed toward the rear of the bracket.

11. In an extendable bed and shelter for motor vehicles of the class described, the combination of a pair of extendably connected box frames each having an open upper side and one open end, said open ends being adjacent each other when said bed is in extended position, U-shaped bows connected at opposite sides of said box frames near their adjacent ends adapted to support a canopy thereover and extending over opposite ends of said frame boxes from their adjacent ends, a flexible canopy over said bows covering both of said box frames, one of said frames retractable within the other, legs pivotally connected to the bottom of said frame boxes for supporting the same on the ground, bracket means in connection with one of said frame boxes connected to the rear of a motor vehicle, said bracket means including a boss fixed to said motor vehicle having a slotted portion therein directed toward the rear thereof, said bracket means also including a bearing member secured on one of said frame boxes having flats on opposite sides thereof adapted to be disengaged if desired through said slot when said extendable bed is resting on the ground in extended position.

12. In an extendable bed and shelter for motor vehicles of the class described, the combination of a pair of extendably connected box frames each having an open upper side and one open end, said open ends being adjacent each other when said bed is in extended position, U-shaped bows connected at opposite sides of said box frames near their adjacent ends adapted to support a canopy thereover and extending over opposite ends of said frame boxes from their adjacent ends, a flexible canopy over said bows covering both of said box frames, one of said frames retractable within the other, legs pivotally connected to the bottom of said frame boxes for supporting the same on the ground, bracket means in connection with one of said frame boxes connected to the rear of a motor vehicle, said bracket means including a boss fixed to said motor vehicle having a slotted portion therein directed toward the rear thereof, said bracket means also including a bearing member secured on one of said frame boxes having flats on opposite sides thereof adapted to be disengaged if desired through said slot when said extendable bed is resting on the ground in extended position, said legs having brace means in connection therewith, said frame boxes having slotted ways therein provided with notches, pins in connection with said legs extending through said slots and engageable in said notches.

13. In an extendable bed and shelter for motor vehicles of the class described, the combination of a pair of frame boxes having open upper sides and each having an open end, one of said boxes positioned within the other and extendable relatively thereto to the extent of approximately twice the length of the frame boxes whereby the open ends of said boxes are in contiguous relationship to each other when extended, bows pivotally connected with one of said frame boxes near the open end thereof and extending to the opposite ends of both of said frame boxes, said bows extending outwardly of said box-shaped frame members, whereby they may be positioned outwardly of one of said box-shaped frame members when the extendable bed is collapsed, and means for connecting said frame boxes to a motor vehicle.

14. In an extendable bed and shelter for motor vehicles of the class described, the combination of a pair of frame boxes having open upper sides and each having an open end, one of said boxes positioned within the other and extendable relatively thereto to the extent of approximately twice the length of the frame boxes whereby the open ends of said boxes are in contiguous relationship to each other when extended, bows pivotally connected with one of said frame boxes near the open end thereof and extending to the opposite ends of both of said frame boxes, said bows extending outwardly of said box-shaped frame members, whereby they may be positioned outwardly of one of said box-shaped frame members when the extendable bed is collapsed, a flexible canopy over said bows, and means for connecting said frame boxes to a motor vehicle.

15. In an extendable bed and shelter of the class described, the combination of a pair of box-shaped frame members extendably connected together, having normally enclosed bottom portions and open upper sides, canopy bows being pivoted at adjacent ends of said frame boxes when in extended relationship to each other, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed, a flexible canopy covering said bows, legs pivotally connected with the normally bottom sides of said frame boxes for supporting the same on the ground, bracket means in connection with one of said boxes being adapted to support said extendable bed on a motor vehicle, said bracket means including a boss fixed to said motor vehicle and having a slotted portion therein directed toward the rear of the bracket.

16. In an extendable bed and shelter of the class described, the combination of a pair of box-shaped frame members extendably connected together, having normally enclosed bottom portions and open upper sides, canopy bows being pivoted at adjacent ends of said frame boxes when in extended relationship to each other, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed, a flexible canopy covering said bows, legs pivotally connected with the normally bottom sides of said frame boxes for supporting the same on the ground, and bracket means in connection with one of said boxes being adapted to support said extendable bed on a motor vehicle, said frame boxes pivotally connected together at their adjacent ends substantially halfway between their upper and lower sides.

17. In an extendable bed and shelter of the class described, the combination of a pair of box-shaped frame members extendably connected together, having normally enclosed bottom portions and open upper sides, canopy bows being pivoted at adjacent ends of said frace boxes when in extended relationship to each other, whereby said bows extend over both of said frame boxes from a position substantially at the middle of said extendable bed, said bows extending outwardly of said box-shaped frame members, whereby they may be positioned outwardly of one of said box-shaped frame members when the extendable bed is collapsed, a flexible canopy covering said bows, legs pivotally connected with the normally bottom sides of said frame boxes for supporting the same on the ground, and bracket means in connection with one of said boxes being adapted to support said extendable bed on a motor vehicle, said frame boxes being slideably telescopically connected together to the extent of approximately one-half of the total length.

18. In an extendable bed and shelter for motor vehicles of the class described, the combination of a pair of extendably connected box frames each having an open upper side and one open end, said open ends being adjacent each other when said bed is in extended position, U-shaped bows connected at opposite sides of said box frames near their adjacent ends adapted to support a canopy thereover and extending over opposite ends of said frame boxes from their adjacent ends, a flexible canopy over said bows covering both of said box frames, one of said frames retractable within the other, legs pivotally connected to the bottom of said frame boxes for supporting the same on the ground, and bracket means in connection with one of said frame boxes connected to a motor vehicle, said bracket means including a boss fixed to said motor vehicle and having a slotted portion therein directed toward the rear thereof said bracket means also including a bearing member secured on one of said frame boxes having flats on opposite sides thereof adapted to be disengaged when desired through said slot when said extendable bed is resting on the ground in extended position.

19. In an extendable bed and shelter for motor vehicles of the class described, the combination of a pair of extendably connected box frames each having an open upper side and one open end, said open ends being adjacent each other when said bed is in extended position, U-shaped bows connected at opposite sides of said box frames near their adjacent ends adapted to support a canopy thereover and extending over opposite ends of said frame boxes from their adjacent ends, a flexible canopy over said bows covering both of said box frames, one of said frames retractable within the other, legs pivotally connected to the bottom of said frame boxes for supporting the same on the ground, and bracket means in connection with one of said frame boxes connected to a motor vehicle, said bracket means including a boss fixed to said motor vehicle having a slotted portion therein directed toward the rear thereof, said bracket means also including a bearing member secured on one of said frame boxes having flats on opposite sides thereof adapted to be disengaged when desired through said slot when said extendable bed is resting on the ground in extended position, said legs having brace means in connection therewith, said frame boxes having slotted ways therein provided with notches, pins in connection with said legs extending through said slots and engageable in said notches.

BYRON M. TAYLOR.

References Cited in the file of this patent

UNITED STATES PATENTS

| Number | Name | Date |
|---|---|---|
| 1,150,106 | Ericson | Aug. 17, 1915 |
| 1,193,272 | La Forest | Aug. 1, 1616 |
| 1,356,154 | Kline | Oct. 19, 1920 |
| 1,366,758 | White | Jan. 25, 1921 |
| 1,377,852 | Patterson | May 10, 1921 |
| 1,424,222 | Tuttle | Aug. 1, 1922 |
| 1,474,929 | Fagan | Nov. 20, 1923 |
| 1,463,499 | Burroughs | July 31, 1923 |
| 1,693,012 | Wright | Nov. 27, 1928 |
| 2,223,074 | Martin | Nov. 26, 1940 |
| 2,378,448 | Thompson | June 19, 1945 |

FOREIGN PATENTS

| Number | Country | Date |
|---|---|---|
| 621,026 | France | Jan. 29, 1927 |